United States Patent [19]

Udono

[11] Patent Number: 5,286,120
[45] Date of Patent: Feb. 15, 1994

[54] DATA PRINTING SYSTEM WITH SCANNING OF FORMS

[75] Inventor: Kazuya Udono, Tokyo, Japan

[73] Assignee: Kabushiki Kaisha Toshiba, Kanagawa, Japan

[21] Appl. No.: 908,553

[22] Filed: Jun. 30, 1992

Related U.S. Application Data

[63] Continuation of Ser. No. 560,001, Jul. 27, 1990, abandoned, which is a continuation of Ser. No. 250,645, Sep. 29, 1988, abandoned.

[30] Foreign Application Priority Data

Sep. 30, 1987 [JP] Japan ................. 62-246021

[51] Int. Cl.$^5$ ............................... B41J 5/30
[52] U.S. Cl. ............................... 400/61; 400/68; 400/703; 395/115
[58] Field of Search ............ 400/61, 63, 68, 70, 400/76, 583.3, 703, 73; 364/225.6, 226.1, 930–930.7; 395/113, 114, 115, 116

[56] References Cited

U.S. PATENT DOCUMENTS

| | | | |
|---|---|---|---|
| 4,541,337 | 9/1985 | Schaul | 400/583.3 |
| 4,549,077 | 10/1985 | Kataoka | 346/160 |
| 4,658,366 | 4/1987 | Posh | 400/279 |
| 4,695,171 | 9/1987 | Sapitowicz | 400/70 |

FOREIGN PATENT DOCUMENTS

| | | | |
|---|---|---|---|
| 38281 | 4/1981 | Japan | 400/130 |
| 178279 | 10/1984 | Japan | 400/583.3 |
| 56577 | 4/1985 | Japan | 400/583.3 |
| 67180 | 4/1985 | Japan | 400/61 |
| 90787 | 5/1985 | Japan | 400/70 |
| 7985 | 1/1986 | Japan | 400/61 |
| 116560 | 6/1986 | Japan | 400/73 |
| 152877 | 7/1987 | Japan | 400/583.3 |
| 158072 | 7/1987 | Japan | 400/61 |

OTHER PUBLICATIONS

"Micro Ref Quick Reference Guide to Word Perfect", 1986.
"Word Perfect Tips & Tricks", Alan R. Neibauer, 1986.

Primary Examiner—David A. Wiecking
Attorney, Agent, or Firm—Finnegan, Henderson, Farabow, Garrett & Dunner

[57] ABSTRACT

A system for printing data on a corresponding one of a plurality of record forms. The system includes a unit for distinguishing each of a plurality of record forms from each other, a data control unit governed by the distinguishing unit for transmitting data corresponding to the distinguished record form and a printing unit controlled by the data control unit for printing the transmitted data on the distinguished form.

9 Claims, 3 Drawing Sheets

DATA PRINTING SYSTEM WITH SCANNING OF FORMS

This application is a continuation of application Ser. No. 07/560,001, filed Jul. 27, 1990, which is a continuation of Ser. No. 07/250,645, both now abandoned.

BACKGROUND OF THE INENTION

This invention relates to a data printing system, and more particularly to a data printing system and related method of printing data on different type forms.

In FIG. 1, a conventional data printing system employs a plotter device 11 as a printing device. A control part 12 functions as a data management device. It stores various types of data that are keyed in from a keyboard 13 to the control part 12. Such data may be, for example, sale amount data for one day for each of various sale articles. These sale amount data are arranged to be displayed on a display 14.

In such a system, we may first of all explain the case where the sale amounts for one day are plotted on respective record forms over, for example, one week, changing the record form for each sale article. The sequence of sale amount data of each sale article sent from the control part 12 is set beforehand for example as sale articles A, B, C, .... Consequently, the sequence of record forms accommodated in a tray 15 is made to correspond to the order of output of sale data before the plot operation. Thus, the tray 15 holding record forms arranged in an order matching this sequence is loaded, then a print request is keyed in from the keyboard 10. Thereupon, the control part 12 sends the sale data to the plotter device 11, in the sequence: the sale article A, the sale article B, the sale article C .... First of all, in the plotter device 11, one record form is taken out of the tray 15 and set in a prescribed position 16. After that, the record form is sent to a form receptacle 17 after the sale data of the sale article A is plotted. Next, one record form is again taken out from the tray 15, and set in the prescribed position 16, the sale data is plotted, and the form is sent to the form receptacle 17. In this way, the sale data of the sale articles A, B, C, ... is plotted on respective record forms.

However, in the above-described system, the sequence of the sale data sent from the control part 12 is preset, so, when the sale data is plotted, the record forms and the data output are in the same sequence. Therefore, with the increase in the number of record forms, the task of making these sequences match becomes troublesome.

SUMMARY OF THE INVENTION

It is an object of the invention to carry out the printing of prescribed data corresponding to a plurality of record forms, automatically.

Another object of the invention is to make it possible to easily print on each of a plurality of record forms, prescribed data corresponding to the particular record form.

The foregoing objects are achieved according to the present invention by providing a system for printing data on a corresponding one of a plurality of record forms, including a unit for distinguishing each of a plurality of record forms from one another, a data control unit governed by the distinguishing unit for transmitting data corresponding to the distinguished record form, and a printing unit controlled by the data control unit for printing the transmitted data on the distinguished form.

According to another aspect of the present invention, the above objects are achieved by providing a method of printing data on a corresponding one of a plurality of record forms, including the steps of storing a plurality of data, distinguishing each of a plurality of record forms, transmitting the stored data corresponding to the distinguished record form, and printing the transmitted data on the distinguished record form.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art, from this detailed description.

DESCRIPTION OF THE PREFERRED EMBODIMENTS

An embodiment of this invention is described below with reference to the drawings.

Figure 1:
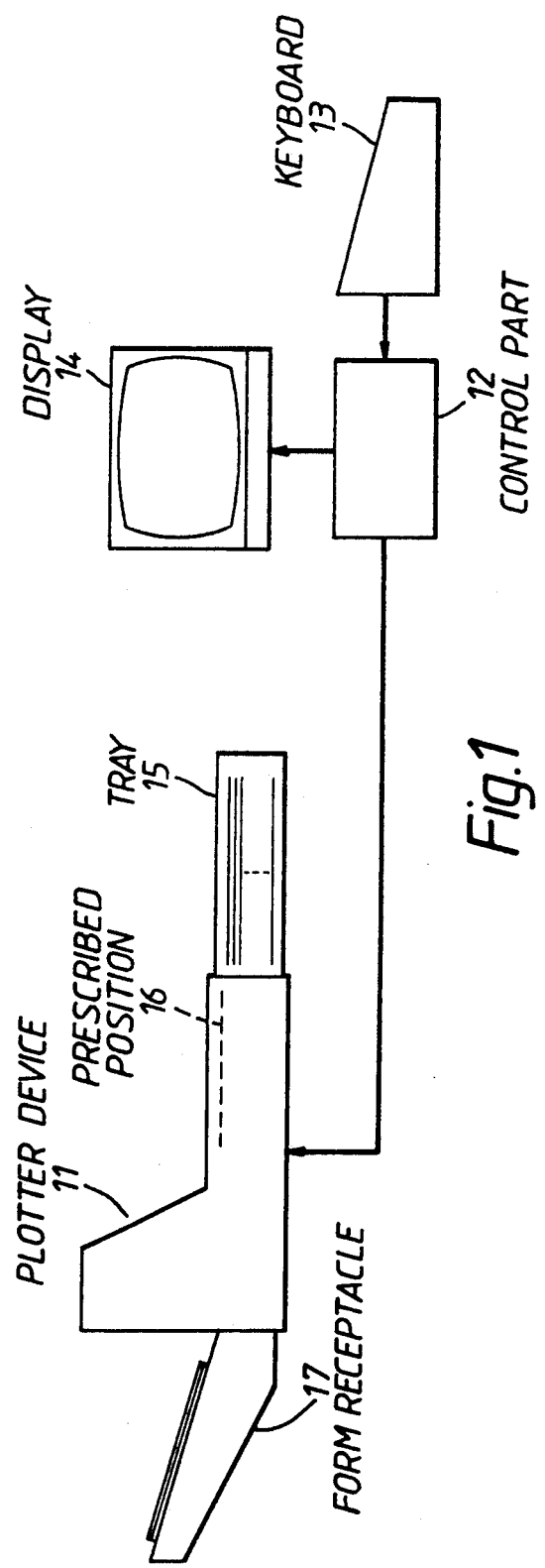
FIG. 1 is a diagram showing a conventional data printing system.
Figure 2:
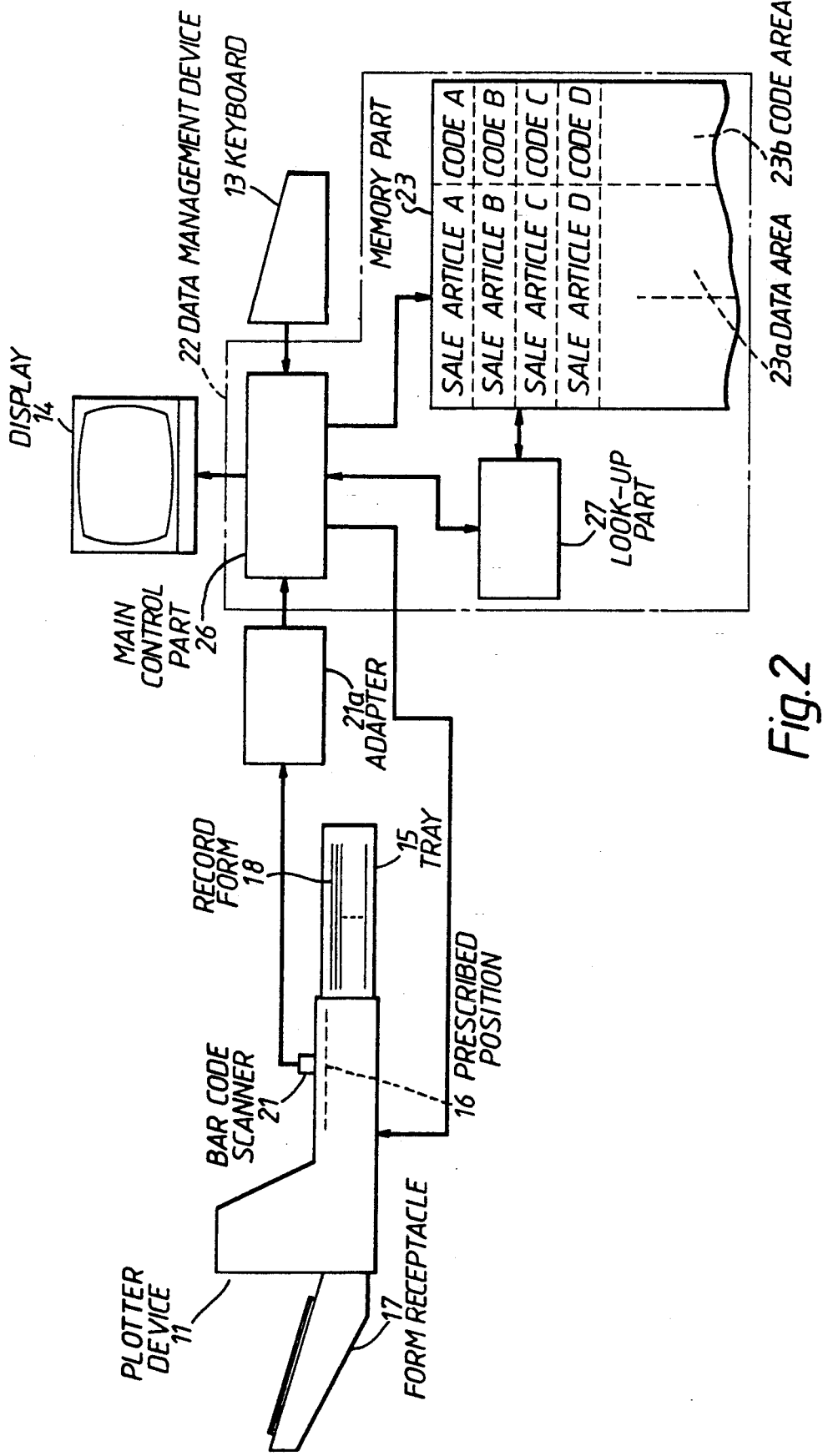
FIG. 2 is a diagram showing a data printing system according to the present invention.

In FIG. 2, a plotter device 11, is used as a printing device. The plotter device 11 is equipped with the function of automatically feeding record forms 18 and plotting on these forms. In order to perform the above function, the plotter device 11 includes a conventional printing main unit and a conventional feeding device, not shown. The plotter device 11 is further provided with a form receptacle 17 for receiving record forms 18 after plotting, and with a tray 15 to hold the record forms 18 awaiting to be fed to the plotter device 11.

Figure 3:
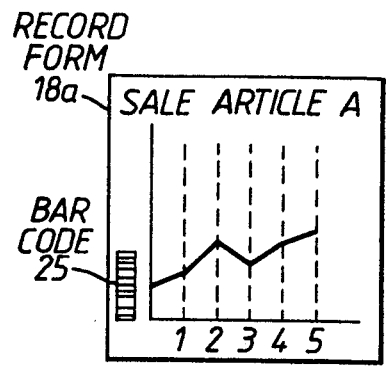
FIG. 3 and FIG. 4 each illustrate an example of a record form used in the system of FIG. 2.
Figure 4:
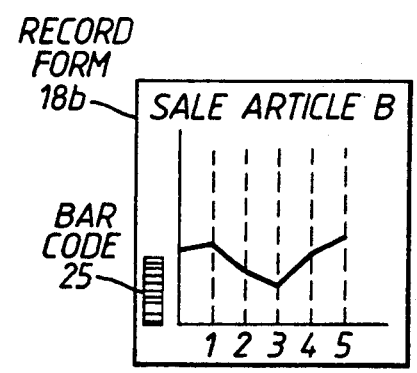

In accordance with the invention, means are provided for distinguishing each of a plurality of record forms from one another. Referring to FIGS. 3 and 4, and as embodied herein, the various record forms 18 are provided with bar codes 24, 25 as symbols to distinguish various sale articles A, B, C whose sale amount data are plotted on record forms such as 18a and 18b. On the plotter device 11, there is provided a sensor, such as a bar code scanner 21 at location 16 adjacent record forms 18.

The present invention includes a data control means governed by the distinguishing means for transmitting data corresponding to the distinguished record form. As embodied herein, the data control means comprises a data management device 22.

The read signal output from the bar code scanner 21 is converted by an adapter 21a into a signal that is easy to process, and is sent to data management device 22.

The data management device 22 manages the various sale amount data of the sale articles A, B, C, .... It is provided with a memory part 23 for storing the various sale amount data of the various sale articles A, B, C, .... The memory part 23 provides a data area 23a for storing the respective sale amount data of the sale articles A, B, C, . . . , and a code area 23b for storing the respective codes corresponding to the respective sale amount data of the sale articles A, B, C, . . . . These codes coincide with the respective bar codes 24, 25 provided on record forms 18. A main control part 26 has the function of sending the bar codes received from the bar code scanner 21 to a look-up part 27, and, when the sale amount data have been looked up by the look-up part 27, sending them to the plotter device 11. When the look-up part 27 receives a bar code, it searches the code area 23b. When it finds the same code, it reads the sale amount data from the data area corresponding to that code which it has looked up, and sends this to the main control part 26. The main control part 26 is connected with a keyboard 13 and a display 14. The main control part 26 has the function of: storing, i.e. registering in memory part 23, the codes and sale amount data of the sale articles that are keyed in from keyboard 13; and the function of causing to the display 14 to display the sale amount data of sale articles A, B, C, . . . stored in this memory part 23.

Figure 5:
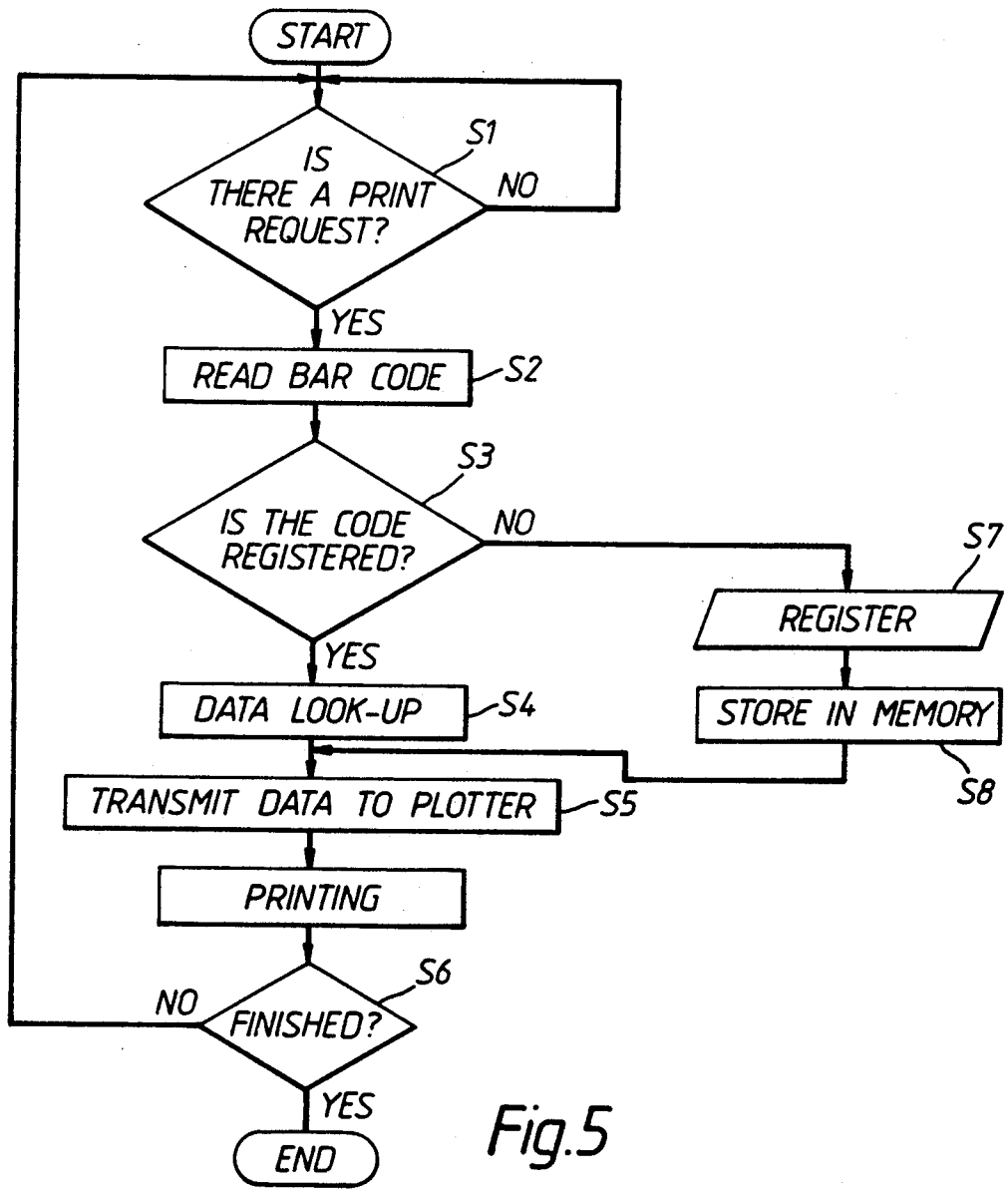
FIG. 5 is a flow chart showing a data printing sequence according to the present invention.

Next, the operation of a system constructed as above will be described with reference to a plot print flow chart shown in FIG. 5. In a step S1, a key input from the keyboard 13 commands printing processing. Thereupon, the content of the key input is sent to the plotter device 11, and the plotter device 11, extracts, for example, a record form 18b from the tray 15 and sets it in a prescribed position 16. At this time, the bar code scanner 21 reads the bar code 25 provided on the record form 18b, and outputs a read signal. The read signal is converted by the adapter 21a into a signal that can easily be processed, and is sent to the main control part 26. When this happens, in a step S2, the main control part 26 receives the read signal and sends it to the look-up part 27. Thereupon, in a step S3, the look-up part 27 searches in the memory part 23, to find out whether the code B of the received bar code has already been keyed in from the keyboard 13. If it has been keyed in, in a step S4, the look-up part 27 reads the sale amount of sale article B from the data area corresponding to the code B, and sends it to the main control part 26. After this, the main control part 26 sends the sale amount data of sale article B to the plotter device 11, which then plots the sale amount data of sale article B on the record form 18b to the form receptacle 11.

It should be noted that, in the decision of the step S3, if no code is registered, code registration is performed in steps S7 and S8. The code B is keyed in from the keyboard 13, and the sale amount data of sale article B corresponding to the code B is keyed in. When this is done, the main control part 26 stores the code B in an empty area of the code area 23b, and stores the sale amount data in a data area corresponding to this code area. Subsequently, on shifting to a step S5, the sale amount data, which has now been keyed in, is transferred to the plotting device 11, and plotted.

Assuming that form 18A is next fed to location 16, the bar code 24 is read by the bar code scanner 21. Thereupon, the look-up part 27 looks up the code A corresponding to the bar code 24 from the memory part 23, and reads the sale amount data of sale article A corresponding to the code A. Thus, the sale amount data of the sale article A is sent to the plotter device 11, and plotted.

Consequently, even if the order of the record forms 18 is random, the sale amount data of sale articles A, B that are not to be plotted on the record forms 18a, 18b can be determined, and the sale amount data of the corresponding sale articles can be reliably plotted on the various record forms.

Therefore, in plotting, the troublesome task of arranging the various record forms 18 in the order in which the sale amount data is to be sent, is completely eliminated. When a supplementary record is to be made of the sale amount data of sale articles, on successive days using the same record form, for example, a particularly large benefit is obtained, since the operation of arranging the record forms each day in the order of data transfer is eliminated.

It should be noted that this invention is not restricted to the above described embodiment, but can be modified in various ways without departing from the scope of its essence. For example, although in the above embodiment a plotter device is used, other printing devices could of course be employed. Also, the invention could be applied to a printing system wherein the printing device and data management device are integrated. Furthermore, other symbols could be used instead of the bar codes. Also, the data is not restricted to sale amount data of sale articles.

What is claimed is:

1. A system for printing input data on a corresponding one of a plurality of different individual record forms, comprising:

a printer;

means for feeding singly to the printer the different individual record forms without regard to the difference between the forms being fed;

means for distinguishing from one another each of the different individual record forms being fed to the printer in accordance with a distinctive code irrespective of the feeding sequence;

data memory for storing input data intended for distinguished individual record forms being fed to the printer;

means responsive to the distinguishing means for determining whether or not the distinctive code is registered in the memory;

means for registering in the memory the distinctive code of a distinguished record form and corresponding input data after determining that the code is not registered and prior to transmitting input data to the printer; and data control means, including first means governed by the determining means for accessing the input data stored in the data memory at times when the distinctive code is registered in the memory to transmit the input data intended for a respective distinguished record form, and including second means governed by the determining means for requiring an input of data corresponding to the unregistered distinctive code to the data memory during a break in processing and prior to any further record forms being fed to the system, said printer being responsive to reception of the transmitted input data for printing on the distinguished record form.

2. The system of claim 1, wherein each of the plurality of individual record forms relates to a different article, and the transmitted input data includes information relating to the article.

3. The system of claim 1 wherein the data control means comprises a look-up part for locating the data from the data memory.

4. The system of claim 1 further comprising a display for displaying the data stored in the data memory.

5. The system of claim 1 wherein the distinguishing means includes a sensor for distinguishing the record form.

6. The system of claim 5 wherein the feeding means comprises a receptacle for stacking the individual record forms and a feeding device for feeding the record forms automatically in the stacked order to the printer.

7. A method of printing data on a plurality of different individual record forms which have been stacked without regard to the sequence of forms in the stack, the printing of one form, comprising the steps of:

storing input data intended for at least one of the stacked record forms;

feeding the one record form to a printer in the stacked sequence;

distinguishing the one record form being fed to the printer in accordance with a distinctive code;

determining whether or not the distinctive code of the one distinguished record form is registered;

looking up the registered code and corresponding stored input data for the distinguished record form at times when the code is registered;

interrupting processing of the distinguished form at times when it is determined that the code for the distinguished form is unregistered;

requiring an input of input data corresponding to the unregistered code of the distinguished record form during the interruption of the processing in order to continue the processing of the distinguished record form;

storing the distinctive code and input data in response to the input of the data corresponding to the unregistered code;

transmitting the stored input data to the printer in response to the storing of the distinctive code and the input data in memory; and printing the stored input data on the registered distinguished record form in response to the transmission of the stored data.

8. The method of claim 7 wherein the step of transmitting the data comprises the substep of locating the stored data intended for the distinguished record form.

9. The method of claim 7 wherein the step of distinguishing includes sensing symbols on each record form being fed to the printer, and transmitting a code corresponding to the sensed symbols for transmitting the data.

* * * * *